United States Patent
Gao et al.

(10) Patent No.: US 11,623,184 B2
(45) Date of Patent: Apr. 11, 2023

(54) THIN POLYMER MEMBRANE FOR TREATMENT OF SALINE WATER

(71) Applicant: The Hong Kong University of Science and Technology, Hong Kong (CN)

(72) Inventors: Ping Gao, Hong Kong (CN); Ping Sheng, Hong Kong (CN); Qiao Gu, Hong Kong (CN); Qinghua Zhang, Hong Kong (CN); Jin Li, Hong Kong (CN); Runlai Li, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 706 days.

(21) Appl. No.: 16/586,245

(22) Filed: Sep. 27, 2019

(65) Prior Publication Data

US 2020/0101427 A1   Apr. 2, 2020

Related U.S. Application Data

(60) Provisional application No. 62/766,040, filed on Sep. 28, 2018.

(51) Int. Cl.
  *B01D 71/26* (2006.01)
  *B01D 69/10* (2006.01)
  (Continued)

(52) U.S. Cl.
  CPC ............ *B01D 71/26* (2013.01); *A23L 2/082* (2013.01); *A23L 2/74* (2013.01); *B01D 61/364* (2013.01);
  (Continued)

(58) Field of Classification Search
  CPC ...... B01D 71/26; B01D 61/364; B01D 69/10; B01D 69/12; B01D 2325/34; B01D 69/02;
  (Continued)

(56) References Cited

U.S. PATENT DOCUMENTS

| 5,232,085 A | 8/1993 | Hayashi et al. |
| 7,963,401 B2 | 6/2011 | Ge et al. |

(Continued)

FOREIGN PATENT DOCUMENTS

| GB | 1 113 630 A | 5/1968 |
| JP | 2009-193731 A | 8/2009 |
| WO | WO-2015/189705 A1 | 12/2015 |

OTHER PUBLICATIONS

Tijing, L. D. et al., "Superhydrophobic nanofiber membrane containing carbon nanotubes for high-performance direct contact membrane distillation," *Journal of Membrane Science*, 2016, 502:158-170, 2015 Elsevier B.V.

(Continued)

*Primary Examiner* — Krishnan S Menon
(74) *Attorney, Agent, or Firm* — Saliwanchik, Lloyd & Eisenschenk

(57) ABSTRACT

An ultra high molecular weight polyethylene (UHMWPE) membrane has at least one nanoporous UHMWPE film, where each of the nanoporous UHMWPE film is biaxial oriented with a thickness of 0.1 to 12 μm and pores that exclude particles in excess of 10 nm with a total porosity of 65 to 75 percent. The nanoporous UHMWPE film can be coated or laminated by a hydrophilic polymer to form a Janus membrane and can be made with a multilayer composite structure. The UHMWPE membrane can be used in a device for molecular distillation (MD), reverse osmosis (RO), or forward osmosis (FO).

19 Claims, 11 Drawing Sheets

(51) Int. Cl.
*B01D 61/36* (2006.01)
*B01D 69/12* (2006.01)
*A23L 2/74* (2006.01)
*A23L 2/08* (2006.01)
*C02F 1/44* (2006.01)
*C02F 103/08* (2006.01)

(52) U.S. Cl.
CPC ............ *B01D 69/10* (2013.01); *B01D 69/12* (2013.01); *C02F 1/447* (2013.01); *A23V 2002/00* (2013.01); *C02F 2103/08* (2013.01)

(58) Field of Classification Search
CPC ..... B01D 61/002; B01D 61/025; A23L 2/082; A23L 2/74; A23L 2/085; C02F 1/447; C02F 2103/08; C02F 1/441; C02F 1/445; A23V 2002/00; Y02A 20/124; Y02A 20/131
See application file for complete search history.

(56) References Cited

U.S. PATENT DOCUMENTS

| | | |
|---|---|---|
| 2010/0282680 A1 | 11/2010 | Su et al. |
| 2016/0107121 A1 | 4/2016 | Lienhard et al. |
| 2016/0207798 A1 | 7/2016 | Mahurin et al. |
| 2017/0144110 A1 | 5/2017 | Shimura et al. |
| 2019/0267594 A1* | 8/2019 | Gao ................ H01M 50/44 |
| 2020/0277465 A1* | 9/2020 | Kondo ............. H01M 50/494 |
| 2020/0360870 A1* | 11/2020 | Gao ................ B01D 69/02 |

OTHER PUBLICATIONS

Zuo, J. et al., "PVDF hollow fibers with novel sandwich structure and superior wetting resistance for vacuum membrane distillation," *Desalination*, 2017, 417:94-101, Elsevier B.V.

Shahabadi, S. M. S. et al., "Superhydrophobic dual layer functionalized titanium dioxide/polyvinylidene fluoride-co-hexafluoropropylene ($TiO_2$/PH) nanofibrous membrane for high flux membrane distillation," *Journal of Membrane Science*, 2017, 537:140-150, Elsevier B.V.

Zhao, F. et al., "Highly efficient solar vapour generation via hierarchically nanostructured gels," *nature nanotechnology*, Jun. 2018, 13:489-495, Macmillan Publishers Limited.

Chen, W. et al., "High-flux water desalination with interfacial salt sieving effect in nanoporous carbon composite membranes," *nature nanotechnology*, Apr. 2018, 13:345-350, Macmillan Publishers Limited.

Li, L. et al., "Composite PVA/PVDF pervaporation membrane for concentrated brine desalination: Salt rejection, membrane fouling and defect control," *Desalination*, 2017, 422:49-58, Elsevier B.V.

* cited by examiner

THIN POLYMER MEMBRANE FOR TREATMENT OF SALINE WATER

CROSS-REFERENCE TO RELATED APPLICATION

This application claims the benefit of U.S. Provisional Patent Application Ser. No. 62/766,040, filed Sep. 28, 2018, which is hereby incorporated by reference in its entirety including any tables, figures, or drawings.

BACKGROUND OF THE INVENTION

Traditional desalination involves a distillation process, which requires a large amount of energy, or a filtration process using polymeric membranes, which require a high salt rejection rate and a high freshwater flux. The polymeric membranes used in reverse osmosis (RO) and forward osmosis (FO) desalination processes relatively dense to allow them to function via a solution-diffusion mechanism. In contrast, membranes that are used for membrane distillation (MD) process are microporous with hydrophobic micropores that permit the transport of water vapor by Knudsen diffusion through the membrane but block liquid transport. The driving force in the MD process is the vapor pressure difference gradient across the hydrophobic membrane. The flux in most of the polymeric membrane processes is limited by the low pressure gradient across the membranes. There are no membranes specifically designed for membrane distillation processes. Typically, current membrane distillation processes employ highly porous (porosity >60%) hydrophobic microporous membranes with membrane pore sizes of ~0.5 µm, and membrane thicknesses larger than 20 µm. The large membrane thickness is necessary to ensure membrane integrity but leads to reduced driving force for desalination flux. Table 1, below, summarizes the performance of membranes that have been developed.

Membrane creep and a high friction coefficient induced by a porous structure contribute to membrane fouling.

The most critical issue limiting the wide use of membrane distillation is the high energy cost related to the large latent heat associated with water vaporization. No current membranes are available to reduce this thermodynamically important limitation.

Hence there is a need for improved membranes that can provide: extremely high flux at relatively low feed temperature; very robust mechanical properties against high external pressures; low mass transfer resistance by being very thin (few microns); highly anti-fouling property for long term operating stability; low-costs and ease of fabrication; and reduction of the latent heat of water vaporization to reduce energy cost.

BRIEF SUMMARY OF THE INVENTION

An embodiment of the invention is directed to an nanoporous ultra high molecular weight polyethylene (UHMWPE) film comprising membrane formed from at least one nanoporous UHMWPE film where each of the nanoporous UHMWPE films are biaxial oriented with a thickness of 0.1 µm to 12 µm and pores that exclude particles in excess of 10 nm with a total porosity of 65 to 75 percent. The UHMWPE membrane can include a plurality of nanoporous UHMWPE films, for example, two to four films. The nanoporous UHMWPE film can have a thickness of more than 0.1 µm but less than 12 µm with an ultimate tensile strength of at least 400 MPa and a modulus of at least 1.0 GPa. These membranes are useful for processing fluids. The nanoporous UHMWPE film can be a hydrophilic polymer coated nanoporous UHMWPE film or a hydrophilic polymer laminated nanoporous UHMWPE film. The hydrophilic polymer coated nanoporous UHMWPE film can have a polyvinyl alcohol, polyethylene oxide, a polyethylene oxide-block-polypropylene oxide coating or other hydrophilic coating. The hydrophilic polymer laminated hydrophobic nanoporous UHMWPE film can have a nanoporous UHMWPE film laminated to a porous support substrate.

In an embodiment of the invention, a device to perform desalination of salt water comprises a UHMWPE compris-

TABLE 1

State of the Art Membrane Performance

| Membrane | Feed inlet temp. (° C.) | Feed NaCl conc. (wt %) | Feed flow rate (m/s) | Permeate inlet temp. (° C.) | Membrane thickness (µm) | Flux (L/m²-h) |
| --- | --- | --- | --- | --- | --- | --- |
| $CF_4$ modified PES flat sheet | 74.5 | 4.0 | 0.4 | 20 | 201 | 40.9 |
| PVDF/nonwoven flat sheet | 80.5 | 3.5 | 0.3 | 20 | 67 | 47.6 |
| Commercial PTFE flat sheet | 80 | 3.5 | — | 20 | | 35.0 |
| Commercial PTFE flat sheet | 80 | 1.3 | — | 20 | 100 | 88.8 |
| Commercial PP flat sheet | 80 | 1.3 | — | 20 | 160 | 71.0 |
| $CF_4$ modified PES hollow fiber | 73.8 | 4.0 | 2.0 | 20 | 236 | 66.7 |
| PVDF muti-bore hollow fiber | 80 | 3.5 | 0.4 | 17 | 50 | 48.0 |
| PVDF single-layer hollow fiber | 79.5 | 3.5 | 1.9 | 17.5 | 127 | 46.1 |
| PVDF single-layer hollow fiber | 81.3 | 3.5 | 1.8 | 17.5 | 190 | 79.2 |
| PVDF dual-layer hollow fiber | 80.4 | 3.5 | 1.8 | 15.3 | 50 | 66.9 |
| PVDF dual-layer hollow fiber | 80 | 3.5 | 1.4 | 17 | 153 | 83.4 |
| Commercial PP hollow fiber | 90 | 1.0 | 2.3 | 17 | 150 | 79.0 |
| Commercial PE membrane M1 | 80 | 3.5 | 0.2 | 17 | 45 | 83.3 |
| Commercial PE membrane M2 | 80 | 3.5 | 0.2 | 17 | 48 | 97.5 |
| Commercial PE membrane M3 | 80 | 3.5 | 0.2 | 17 | 50 | 123.0 |

Lu et al., *J. Memb. Sci.* 539, 34-42 (2017); Chen, Y. et al. *Desalination* 424, 140-148 (2017); Tijing, L. D. et al., *J. Memb. Sci.* 502, 158-170 (2016); Khayet et al., *J. Memb. Sci.* 252, 101-113 (2005); Laganà et al., *J. Memb. Sci.* 166, 1-11 (2000); Singh et al., *J. Memb. Sci.* 545, 312-322 (2018); An et al., *Desalination* 432, 23-31 (2018); Li et al., *J. Memb. Sci.* 542, 308-319 (2017); Cai et al., *Desalination* 429, 70-75 (2018); Xu et al., *Desalination* 414, 10-17 (2017); Penkova et al., *Mater. Des.* 96, 416-423 (2016); Liu et al., *J. Memb. Sci.* 548, 548-558 (2018); Zhou et al., *J. Memb. Sci.* 524, 1-11 (2017); and Li et al., *Desalination* 422, 49-58 (2017).

Fouling is another critical issue limiting the application of these commercial membranes. To mitigate the low effluent flux, pore sizes larger than 100 nm are typically used, which further reduces the creep resistances of the membrane.

ing membrane. Desalination can be a device for membrane distillation (MD) device, reverse osmosis (RO), or forward osmosis (FO). The UHMWPE comprising membrane is supported on a support that can be a carbon fiber plate or other rigid substrate supports. The device can be a MD device that has a flux through the UHMWPE comprising membrane exceeding 100 LMH where the salt water can be at a concentration of equal or greater than 3.5 wt % having a temperature of at least 40° C. and the purified water on the opposite side of the UHMWPE comprising membrane has a temperature of about 30° C. The device can include a vacuum pump.

An embodiment of the invention is directed to a method of performing a combined vacuum membrane distillation (VMD) and direct contact membrane distillation (DCMD) where a supported UHMWPE comprising membrane separates a salt solution feed chamber and a purified water receiving chamber. Support of the UHMWPE comprising membrane can be by attaching to a carbon fiber or other rigid plates. The salt solution in the salt solution feed chamber can be heated to a temperature of at least 40° C. The purified water from the vapor exiting the UHMWPE comprising membrane enters a chamber evacuated to a vacuum from 0 Bar to 0.97 bar or more. The purified water is cooled to a temperature that is lower than the feed temperature. Optionally, a pressure can be applied to the salt solution. The transporting water vapor through the UHMWPE comprising membrane can occur at a flux of 100 LMH or more. The method can be used to desalinate sea water. The method can be used to concentrate fruit juice or separation of miscible mixtures, such as alcohol from water.

DETAILED DISCLOSURE OF THE INVENTION

Figure 1:
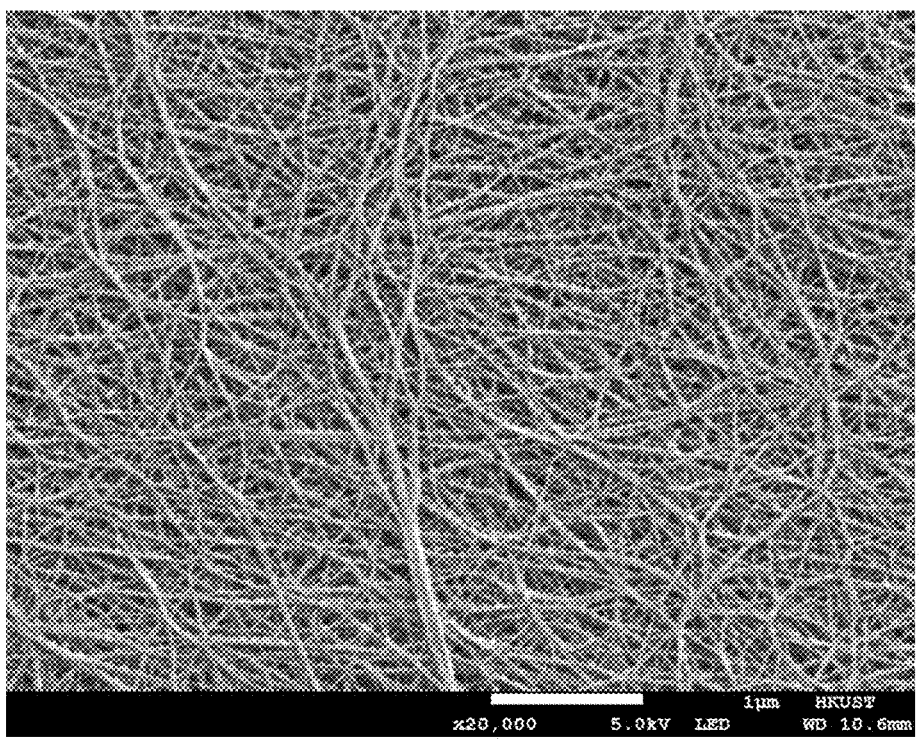
FIG. 1 shows a scanning electron microscopic (SEM) image of the surface morphology of an UHMWPE biaxial oriented nanoporous membrane, according to an embodiment of the invention.
Figure 2:
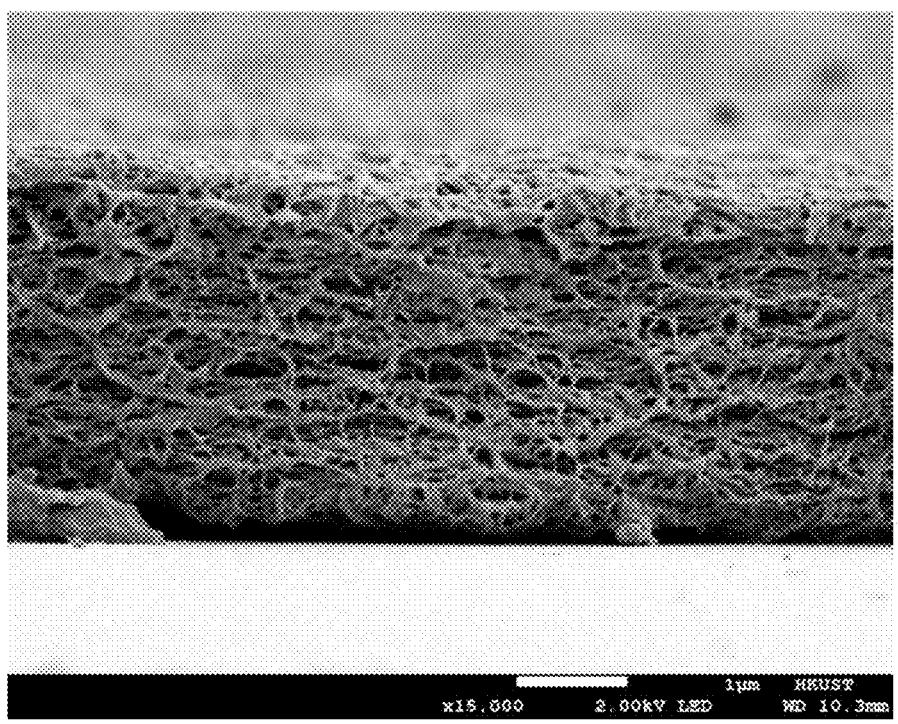
FIG. 2 shows a scanning electron microscopic (SEM) image of the cross-section of a 2 μm UHMWPE biaxial oriented nanoporous membrane, according to an embodiment of the invention.
Figure 3:
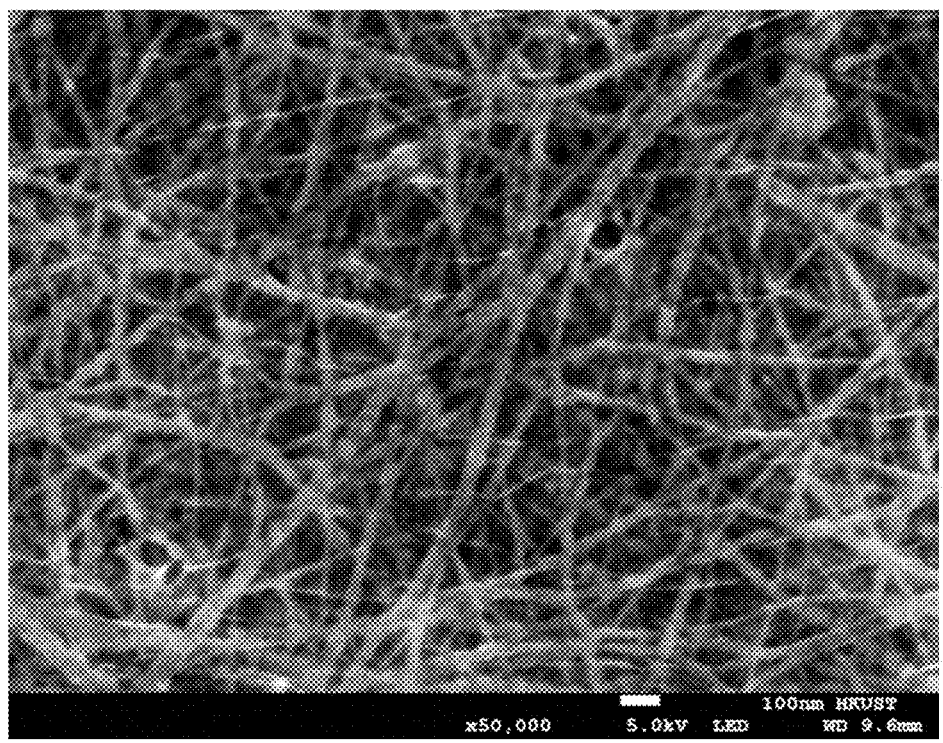
FIG. 3 shows a scanning electron microscopic (SEM) image of the bulk fibrous network of the UHMWPE biaxial oriented nanoporous membrane showing a high porosity, according to an embodiment of the invention.
Figure 4:
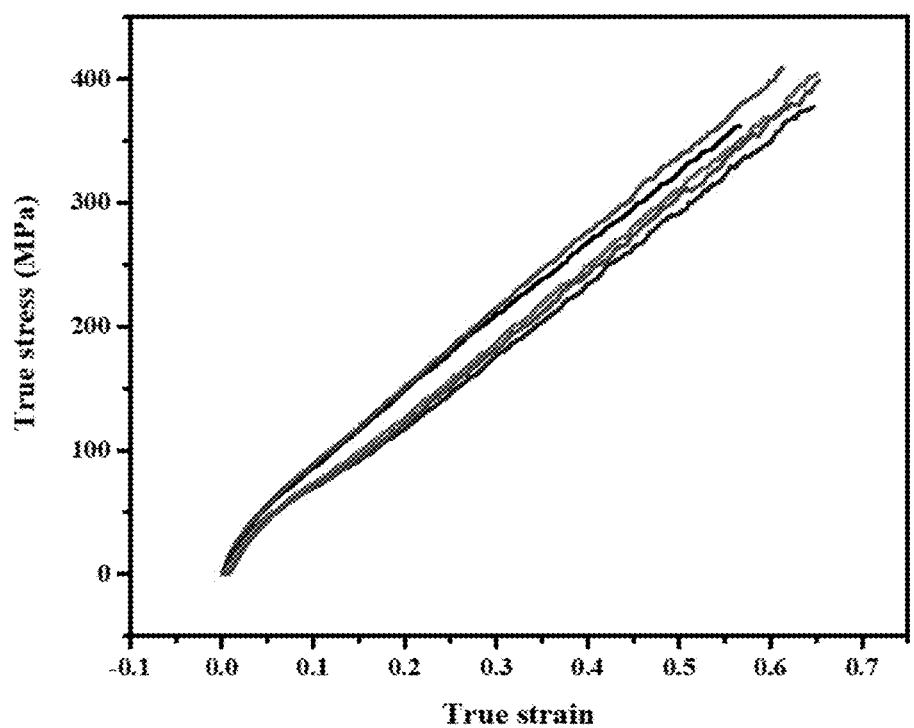
FIG. 4 shows a stress-strain curve of an UHMWPE biaxial oriented nanoporous membrane, according to an embodiment of the invention.
Figure 5:
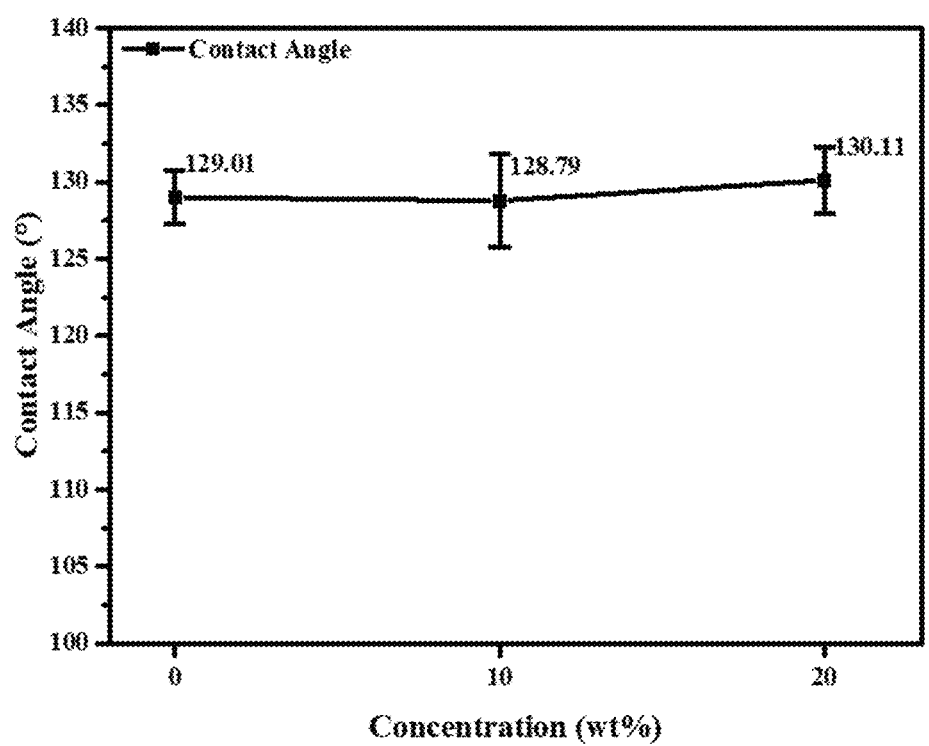
FIG. 5 shows a plot of the contact angle of a salt solution for various concentrations on a UHMWPE biaxial oriented nanoporous membrane, according to an embodiment of the invention.
Figure 6B:
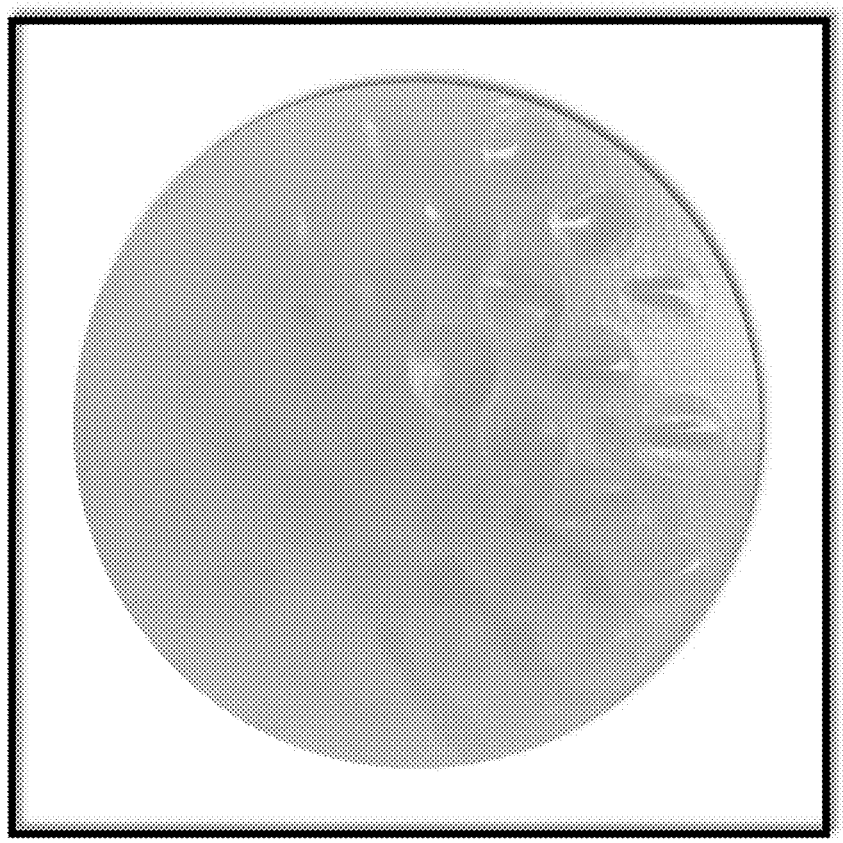
FIG. 6B shows the lack of fouling that has occurred upon use of a 4.5 cm diameter UHMWPE biaxial oriented nanoporous membrane, according to an embodiment of the invention, having a friction coefficient of 0.05.
Figure 6A:
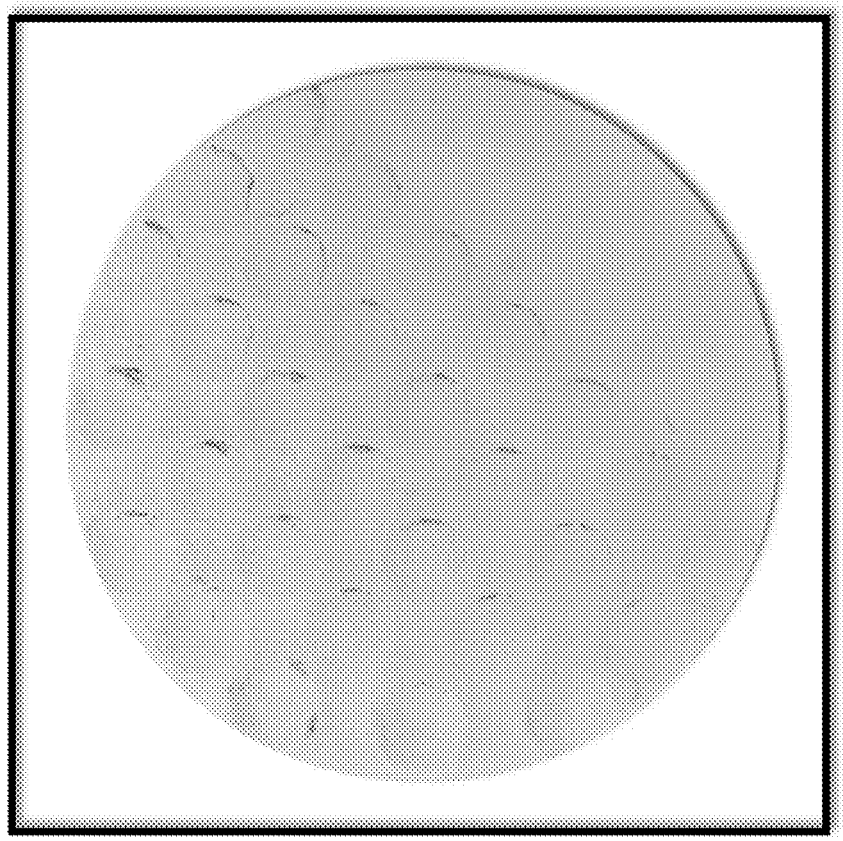
FIG. 6A shows fowling that has occurred upon use of a state of the art 4.5 cm diameter PTFE MD membrane having a friction coefficient of 0.7.

An embodiment of the invention is directed to an extremely high flux biaxial oriented UHMWPE membrane, as shown in FIG. 1, for saline water treatment with high salt rejection. Fabrication of the UHMWPE membrane is in the manner disclosed in PCT Patent Application Publication No. WO/2019/123019, where films of at least 0.1 μm are formed. The UHMWPE membrane film is 0.1 to 12 μm in thickness, as illustrated in FIG. 2 for an exemplary 2 μm membrane. A plurality of membranes in series may be used to carry out desalination. The UHMWPE membrane has a high porosity, with porosity of about 70%, and is illustrated in FIG. 3. The UHMWPE membrane can be used for filtration to remove particles larger than 10 nm. The UHMWPE provides a mechanical robustness, where the resulting membrane has an ultimate tensile strength of about 400 MPa, as indicted in FIG. 4 for a 2 μm membrane, and a modulus of about 1.4 GPa. The UHMWPE membrane displays a contact angle of about 130° with pure water and salt water, as shown in FIG. 5. The UHMWPE membrane displays a very low frictional coefficient of 0.05 which correlates to excellent anti-fowling properties of the UHMWPE membrane, as illustrated in FIG. 6B, relative to a PTFE membrane, as shown in FIG. 6A, where fouling occurs during use in MD.

The UHMWPE membrane, according to an embodiment of the invention, can be used for desalination by membrane distillation (MD), reverse osmosis (RO), or forward osmosis (FO). Because of the UHMWPE membrane's thinness, porosity, and anti-fouling properties, a high flux is observed. The flux of water molecules transport through the UHMWPE membrane in MD is governed by Darcy's law:

$$N=B_f(P_{fm}-P_{pm})$$

where $P_{fm}$ is the vapor on the saline water side of the membrane, $P_{pm}$ is the vapor pressure on the pure water side of the membrane, and $B_f$ is the mass transfer coefficient. The pressure difference is the driven force for this process and is highly related to the water temperatures of both sides of of the membrane, according the Antoine equation. The mass transfer coefficient for a MD process is governed by the equation:

$$B_m = \frac{8}{3}\frac{r\varepsilon}{\delta\tau}\sqrt{\frac{1}{2\pi RM_w T}}$$

where $\delta$ is the membrane thickness, $\varepsilon$ is porosity, $\tau$ is tortuosity, $M_w$ is molecular weight of water, and T is the average temperature across the membrane. A decrease of the membrane thickness significantly increases the mass transfer coefficient. By applying a vacuum to the permeate side of the membrane, a removal of air trapped in the membrane pores is carried out to optimize the mass transfer coefficient. Hence, the ability of the membrane to withstand a high pressure gradient is a critical requirement for desalination processes and the extremely high flux UHMWPE membrane having an ultimate tensile strength of about 400 MPa, similar to steel, allows unprecedented flux.

Figure 7:
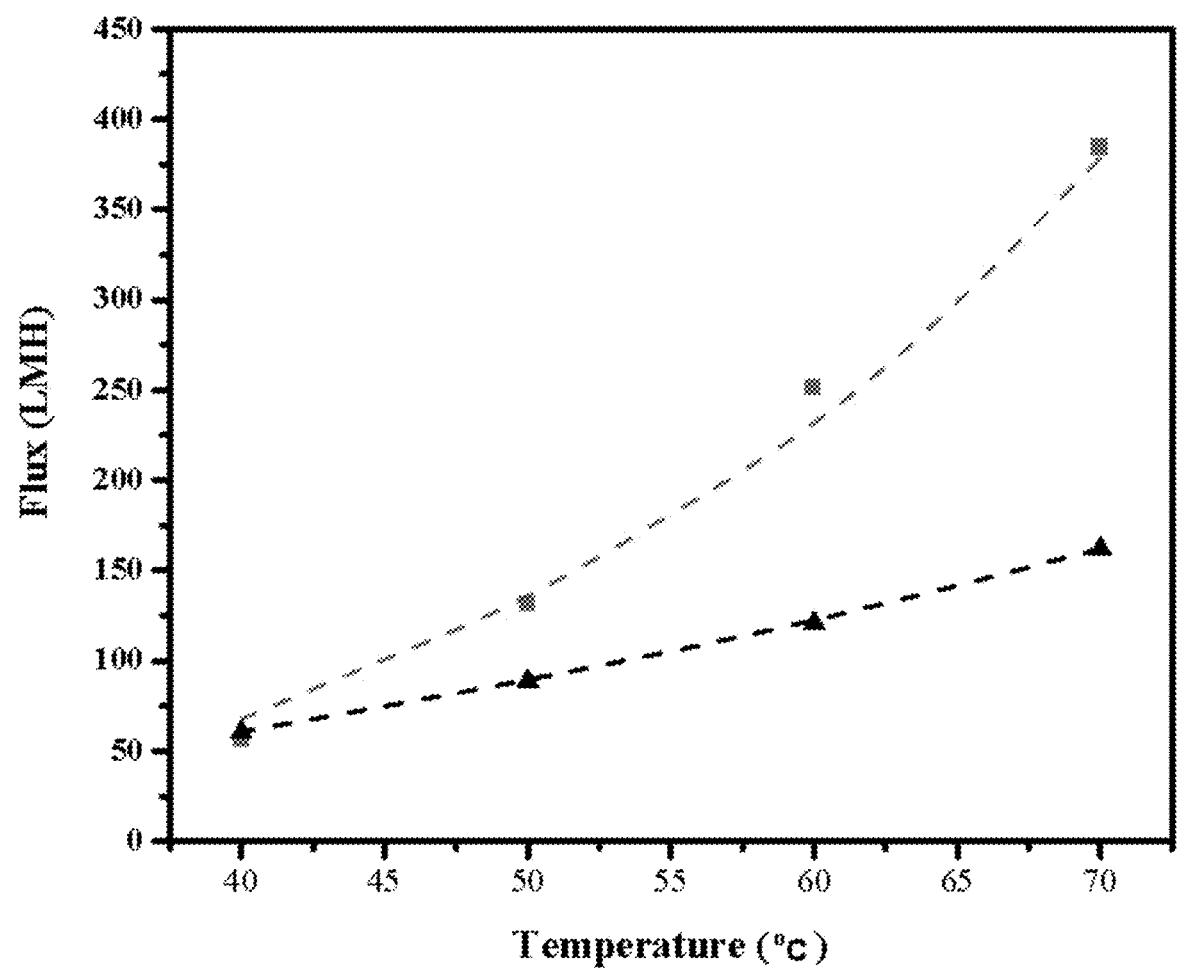
FIG. 7 shows plots for flux values vs. temperature for the UHMWPE biaxial oriented nanoporous membrane, according to an embodiment of the invention, (■) under VMD conditions with a vacuum level 0.97 bar and a sea water salt concentration of 3.5 wt % salt, which is superior to the highest previously recorded state of the art flux values (▲) performed at a sub-sea water concentration of 3 wt %.
Figure 8:
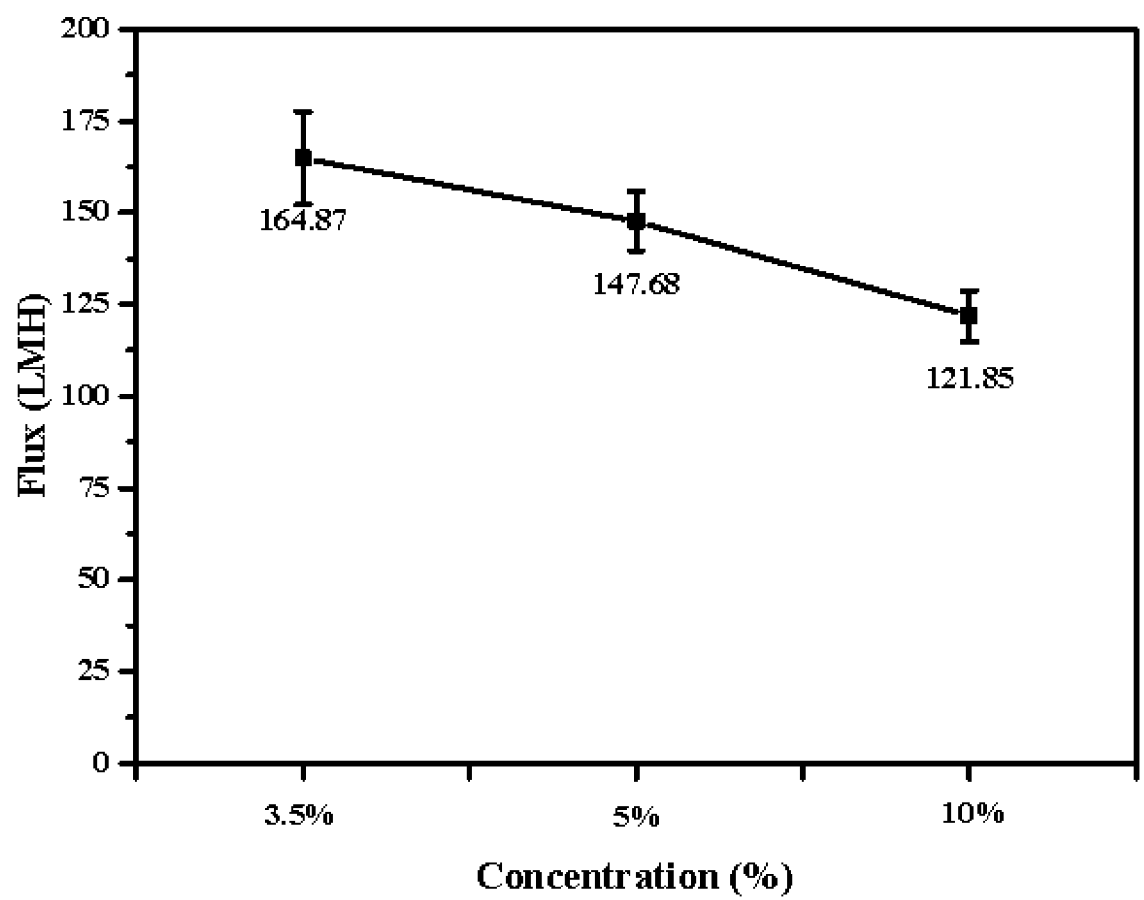
FIG. 8 shows a plot of flux values vs. salt concentration for an MD process at 0.97 bar and 60° C. using a UHMWPE biaxial oriented nanoporous membrane, according to an embodiment of the invention.
Figure 9:
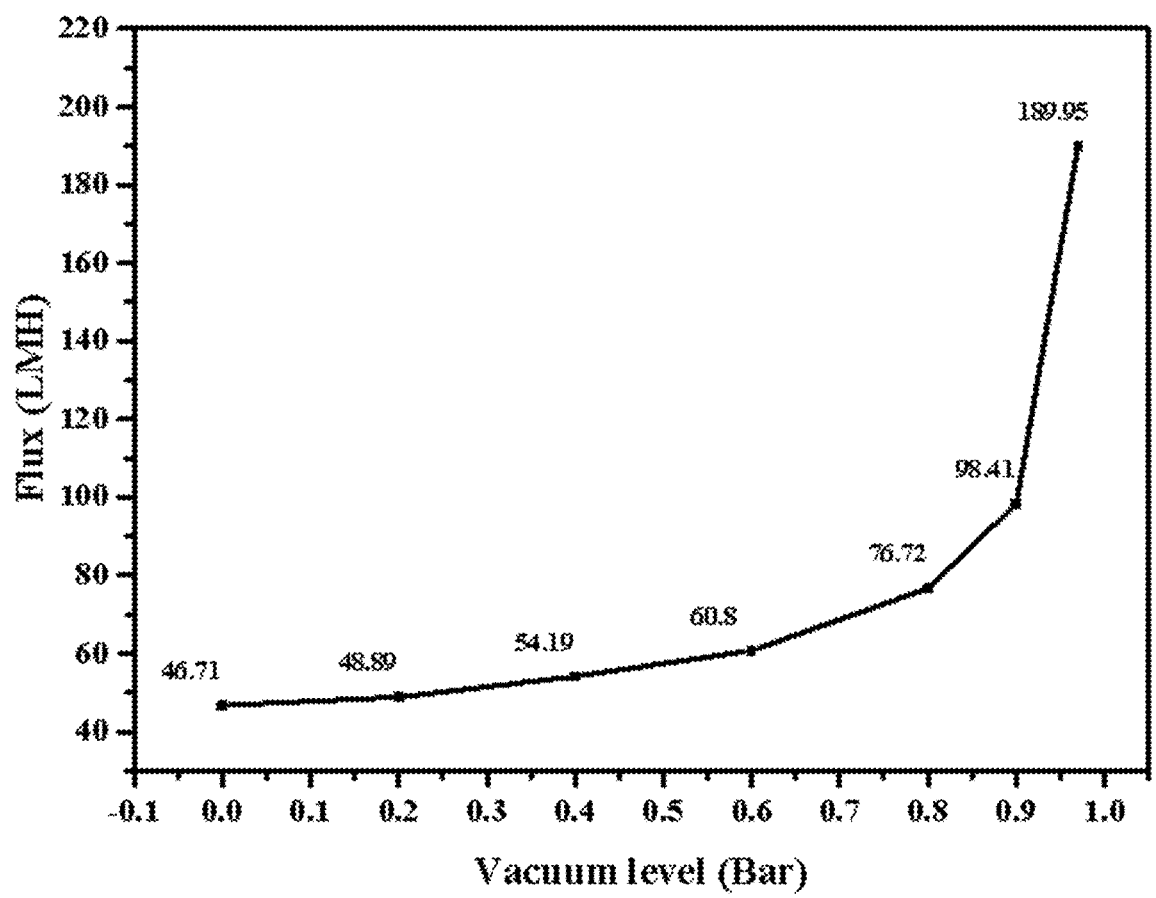
FIG. 9 shows a plot of flux values vs. vacuum level for an MD process at a salt concentration of 3.5 wt % and 60° C. using a UHMWPE biaxial oriented nanoporous membrane, according to an embodiment of the invention.
Figure 10:
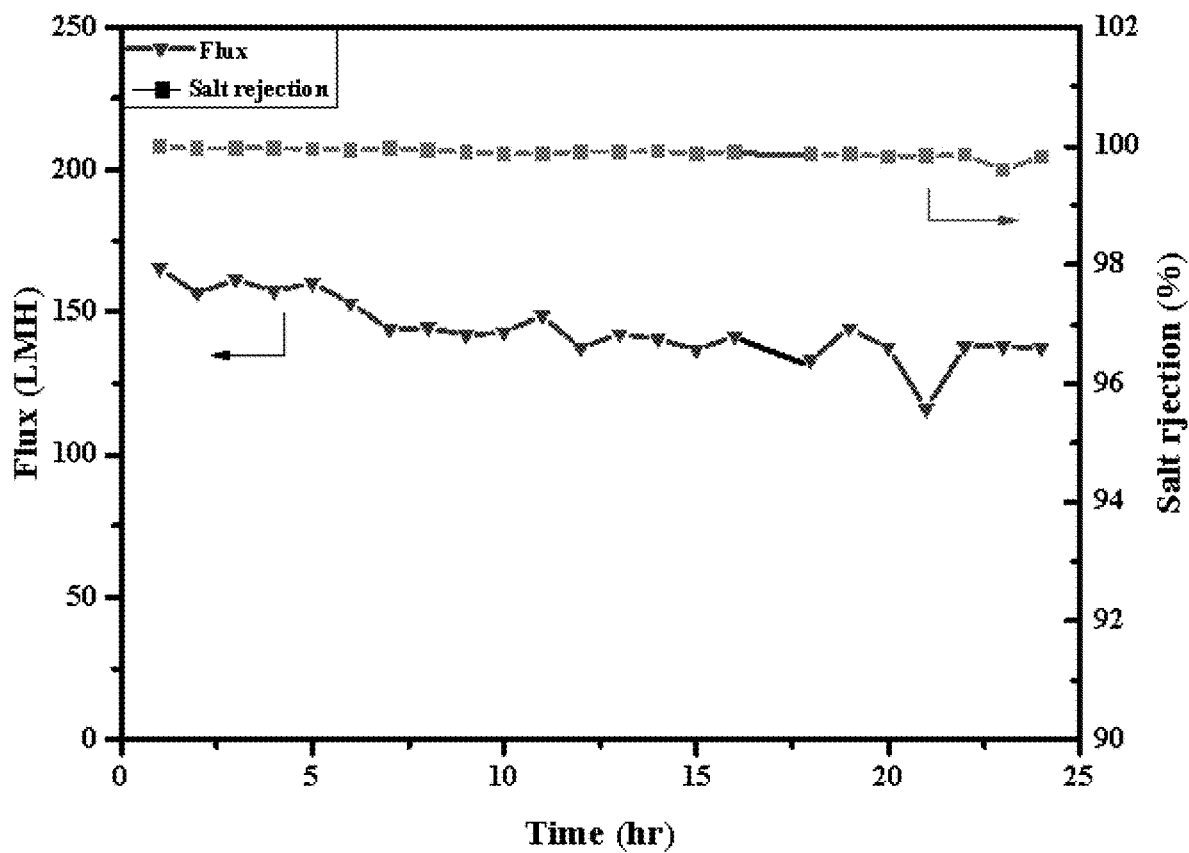
FIG. 10 shows plots of the flux and salt rejection with time for a UHMWPE biaxial oriented nanoporous membrane, according to an embodiment of the invention for an MD process at 0.97 bar and 60° C.

As can be seen in FIG. 7, the flux, in liters/square meters/hour, for UHMWPE membrane, according to an embodiment of the invention, under VMD conditions for sea water, a 3.5% salt concentration solution, with vacuum levels of 0.97 bar, far exceeds that previously achieved record. The UHMWPE membrane, according to an embodiment of the invention, allows a degree of flux with 10 wt % salt that is in excess of the state of the art PTFE membranes at sub-sea water concentrations, as indicated in FIG. 8 at a vacuum level of 0.97 bar. As the flux increases rapidly with vacuum levels, the strength of the UHMWPE membrane is very advantageous, as indicated in FIG. 9. PTFE's low strength, low creep resistance, and high fouling lead to unreliability at high differential pressures. Using similar conditions and an equivalent experimental apparatus, a 20% drop in effluent flux is observed after 2 hours and 50% after 16 hours of continuous operation. On the other hand, using a UHMWPE membrane, according to an embodiment of the invention, the effluent flux stabilizes after loss of 12%, presumably due to membrane compaction, while retaining a very high salt rejection of over 99%, as illustrated in FIG. 10. In addition to the MD process illustrated in FIGS. 7-9, the UHMWPE membrane, according to an embodiment of the invention, are useful for the higher pressure desalination process, such as RO.

As the salt rejection could be affected by potential pinholes in the membranes, a multilayer composite membrane is used to mitigate potential pinhole effects. In this embodiment, ultrapure water can be generated using a 4-layer composite. The amount of different ions in the sea water is measured by the ICP measurement before and after treatment. Interestingly, the desalination flux decreases by only 37% when the membrane thickness increases more than 4 times and the conductivity of the effluent water is below the resolution limit of the instrument, see Table 1 below. As can be seen in Table 1, the conductivity of sea water decreases from the 50,000 μS/cm to 2.7 μS/cm through a single layer membrane; a reduction of 99.5% and well above the standard requirement for drinking water. Ultrapure water is produced with conductivity below the probe's resolution is observed when a 4-layer membrane is employed.

TABLE 1

Flux and Desalinated Water Conductivity for Combination Membranes

| Layers | Flux | Conductivity | Feeding temperature |
| --- | --- | --- | --- |
| Single layer | 378 LMH | 2.7 μS/cm | 70° C. |
| Double layers | 320 LMH | 1.5 μS/cm | |
| Four layers | 244 LMH | Below detection limit | |

TABLE 2

Cation concentrations a % Rejection after Treatment with a Single Layer Membrane

| | Concentration (mg/L) | | | |
| --- | --- | --- | --- | --- |
| Sample Labels | Na | K | Mg | Ca |
| After treatment | 54.2 | 1.29 | 6.18 | 1.93 |
| Before treatment | 13,360 | 404.5 | 1,694 | 489.5 |
| Salt rejection | 99.59% | 99.68% | 99.63% | 99.61% |

Figure 11A:
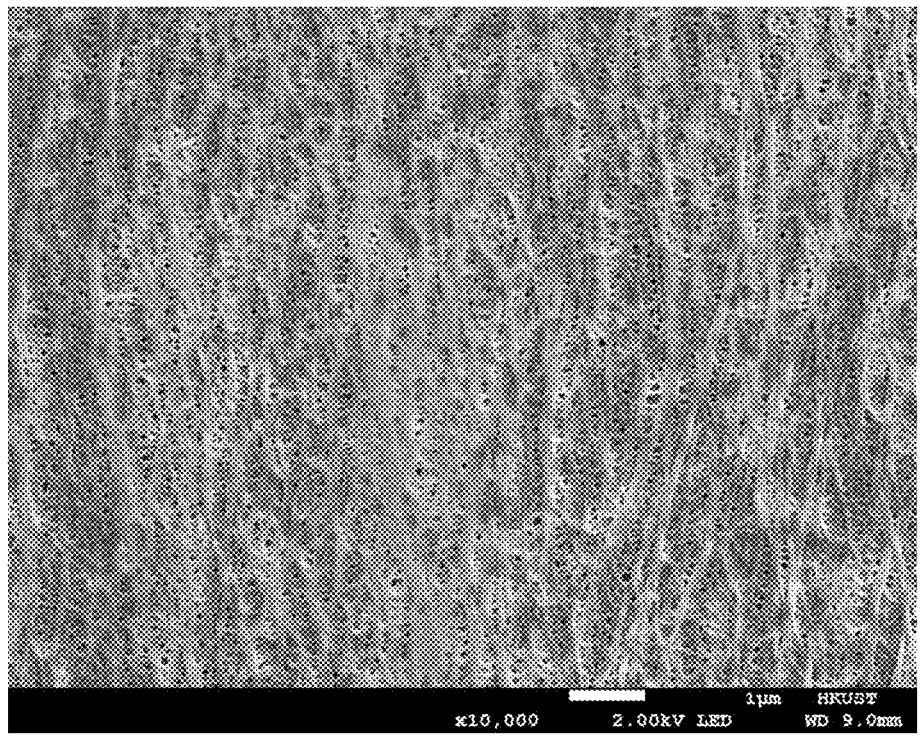
FIG. 11A shows scanning electron microscopic (SEM) image of the surface morphology of PVA coated UHMWPE biaxial oriented nanoporous Janus membrane on PVA side, according to an embodiment of the invention.
Figure 11B:
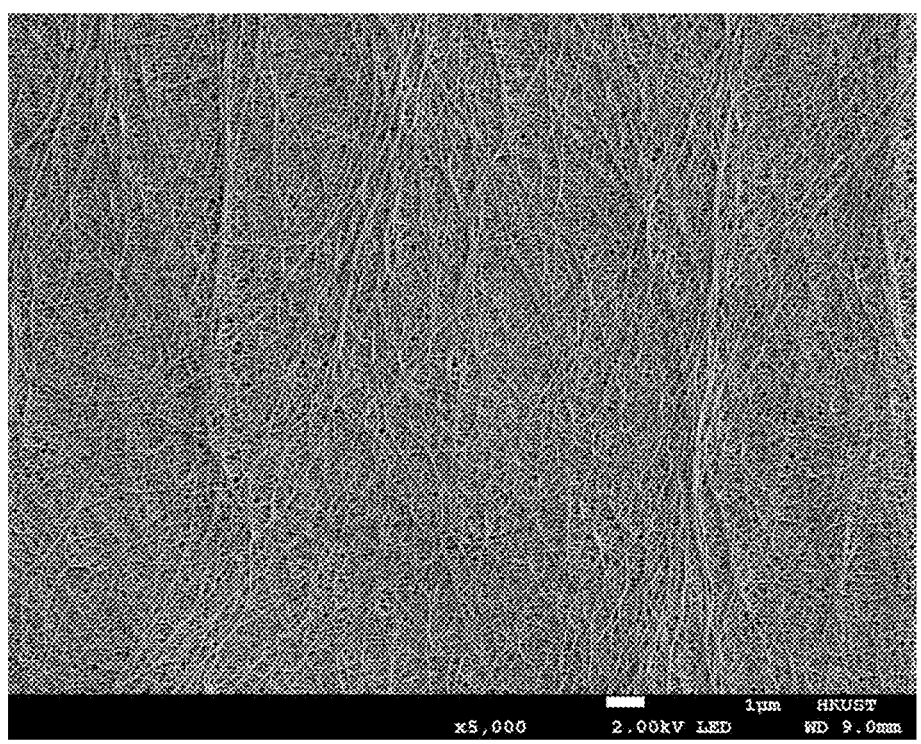
FIG. 11B shows scanning electron microscopic (SEM) image of the surface morphology of PVA coated UHMWPE biaxial oriented nanoporous Janus membrane on UHMWPE side, according to an embodiment of the invention.

In an embodiment of the invention, a Janus membrane consists of a UHMWPE membrane where a UHMWPE membrane coated with a surface modification surfactant, such as PVA, polyethylene oxide, or other hydrophilic treatment. This new Janus membrane is also useful for FO a well as MD. This new Janus membrane is designed to mitigate the most critical energy cost issue with regards to membrane distillation processes. The large latent heat involved in water evaporation has been a major issue to resolve. As illustrated in the table below, effluent flux increases by 60% when all other conditions are remain the same. Using the Knudsen equation, one can calculate the vapor pressure increases by up to 39%, which equivalent to a latent heat reduction of 1.5%. The performance between equivalent UHMWPE membranes, one being unaltered and the other configured as the Janus membrane, using 3.5 wt % NaCl solution is summarized in Table 3, blow. The UHMWPE membrane (2 μm thick) and Janus membrane (0.1 μm thick) are porous with homogeneous nano-fibrils. The Janus membrane, where both sides are shown in FIGS. 11A and 11B, is wrapped with a hydrophilic material.

TABLE 3

Comparison of the MD results between a UHMWPE membrane and the Janus Membrane

| | Membrane | |
| --- | --- | --- |
| Temperature | UHMWPE membrane | Janus membrane |
| 40° C. | 56 kg/m²h | 124 kg/m²h |
| 50° C. | 131 kg/m²h | 217 kg/m²h |
| 60° C. | 251 kg/m²h | 325 kg/m²h |
| 70° C. | 384 kg/m²h | 460 kg/m²h |

Figure 12:
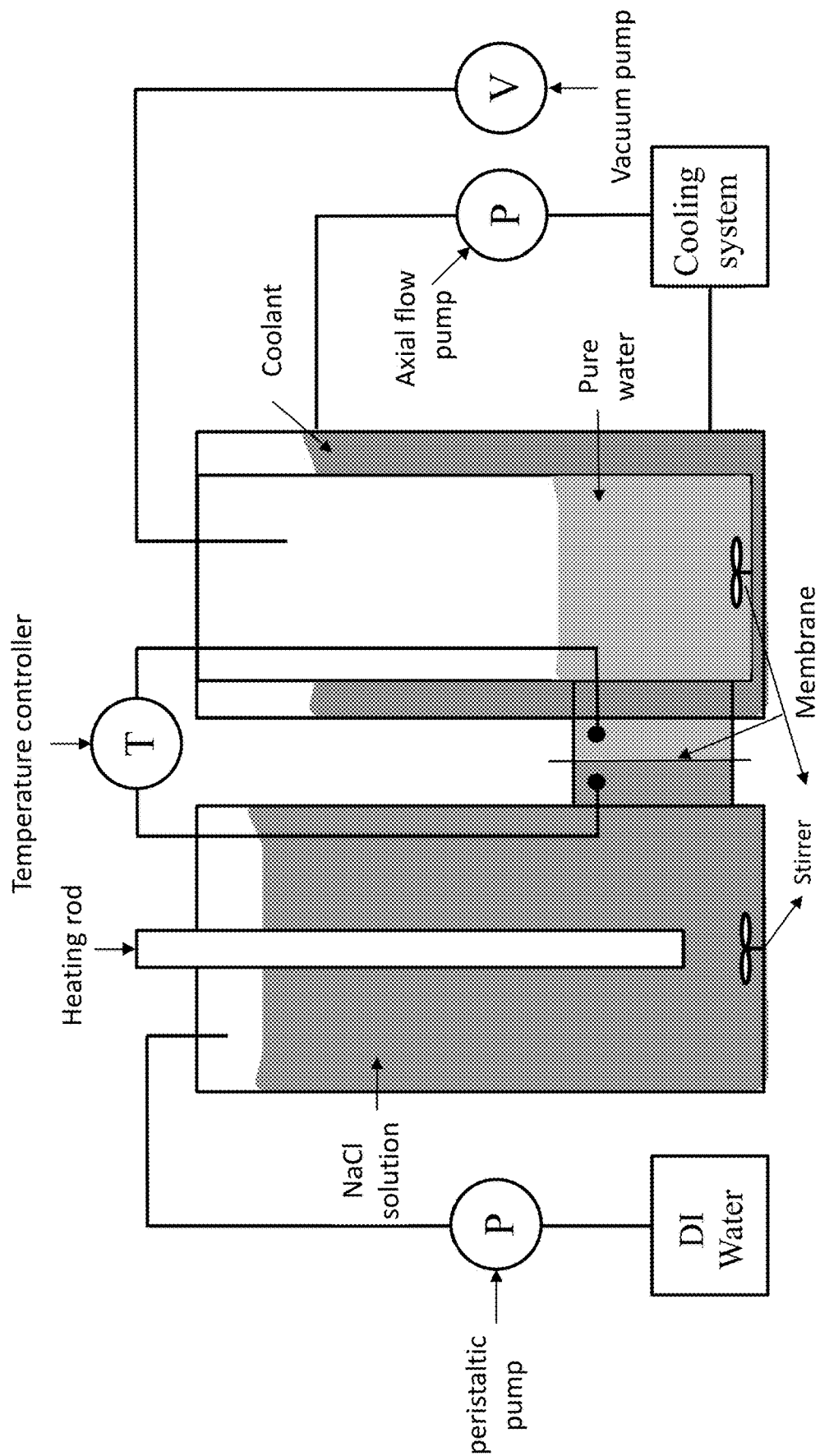
FIG. 12 shows a test combination direct contact MD (DCMD)-vacuum MD (VMD) for illustration of the combined process, according to an embodiment of the invention, where a UHMWPE membrane, according to an embodiment of the invention, resides between the feed salt solution and the purified water vacuum side.
Figure 13:
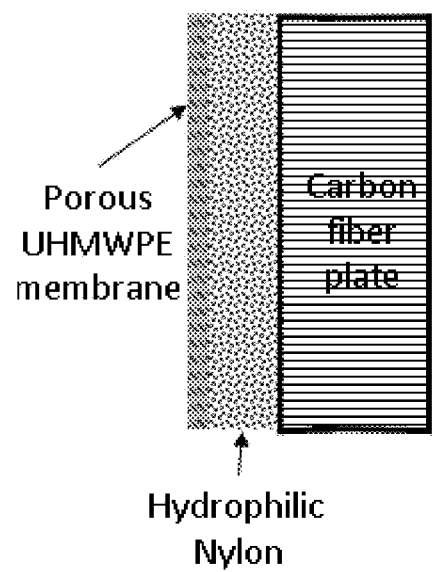
FIG. 13 shows a hydrophilic nylon supported UHMWPE membrane, according to an embodiment of the invention.

In an embodiment of the invention, a semi-batch process using the UHMWPE membrane, combines vacuum membrane distillation (VMD) and direct contact membrane distillation (DCMD). A high liquid entrance pressure, up to or in excess of 5 bars, can be used with the UHMWPE membrane, according to an embodiment of the invention. As shown in FIG. 12, for an MD system, according to an embodiment of the invention, to test the efficacy of the system employs a UHMWPE membrane separates a chamber of the salt feed from a chamber with the permeate purified water vacuum. The feed side chamber contains the NaCl solution, whose concentration is maintained by addition of DI water using a peristaltic pump, is heated using a heater, shown as, but not limited to, a rod heater, to temperatures in excess of 40° C., where the solution is stirred to minimize local high or low salt concentrations and localized temperatures. The vacuum side chamber employs a cooling jacket to maintain a temperature differential across the membrane and the purified water side is stirred to normalize the temperature in the pure water collected in the vacuum side chamber, where the vacuum is maintained by use of a vacuum pump. A vacuum side temperature below the temperature in feeding side is desirable. The UHMWPE comprising membrane can be laminated to porous backing material, which can be supported on a carbon fiber or other strong porous plate, where the hydrophobic UHMWPE membrane side contacts the feed solution. The porous plate can be, but is not limited to, a Nylon 6, Nylon 6/6 or Nylon 4/6 plate. A hydrophilic nylon can be situated between the UHMWPE comprising membrane and the carbon fiber plate, as shown in FIG. 13. In production units practicing the MD method, according to an embodiment of the invention, the feed side can be of a bulk saline source where the solution entering a confined volume in contact with the membrane is heated in an entry conduit feeding the volume and a heating rod, or other localized heating source, is not needed. Likewise, the pure water can be partially recycled in the volume of water removed from the membrane such that the pure water in contact with the membrane is maintained at a desired temperature. In such a configuration the stirrers are not a necessary component of the system and the system can be employed as a continuous system, according to an embodiment of the invention.

All publications referred to or cited herein are incorporated by reference in their entirety, including all figures and tables, to the extent they are not inconsistent with the explicit teachings of this specification. It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A membrane comprising ultra high molecular weight polyethylene (UHMWPE), the membrane comprising at least one nanoporous UHMWPE film, each of the nanoporous UHMWPE film being biaxial oriented with pores that are exclusive to particles in excess of 10 nm with a total porosity of 65 to 75 percent,
wherein the nanoporous UHMWPE film has a thickness greater than 0.1 μm but less than 12 μm, has an ultimate tensile strength of at least 400 MPa, and has a modulus of at least 1.4 GPa.

2. The membrane according to claim 1, wherein the at least one nanoporous UHMWPE film comprises a plurality of nanoporous UHMWPE films.

3. The membrane according to claim 2, wherein the plurality of nanoporous UHMWPE films comprises three or more nanoporous UHMWPE films.

4. The membrane according to claim 1, wherein one nanoporous UHMWPE film is a hydrophilic polymer coated nanoporous UHMWPE film or a hydrophilic polymer laminated nanoporous UHMWPE film.

5. The membrane according to claim 4, wherein the hydrophilic polymer coated nanoporous UHMWPE film comprises a nanoporous UHMWPE film coated with polyvinyl alcohol, polyethylene oxide, or a polyethylene oxide-block-polypropylene oxide or other hydrophilic treatments.

6. The membrane according to claim 4, wherein the hydrophilic polymer laminated nanoporous UHMWPE film comprises a nanoporous UHMWPE film laminated to a hydrophilic nylon or other porous substrate.

7. A device for performing desalination of salt water, comprising the membrane according to claim 1.

8. The device for performing desalination of salt water according to claim 7, wherein the device is a membrane distillation (MD) device.

9. The device for performing desalination of salt water according to claim 7, wherein the membrane is supported on a support.

10. The device for performing desalination of salt water according to claim 7, wherein the support is a porous carbon fiber plate or other porous rigid material.

11. The device for performing desalination of salt water according to claim 7, further comprising a vacuum pump.

12. A method of performing membrane distillation, comprising
supporting a membrane according to claim 1 that separates a salt solution feed chamber and a purified water receiving chamber;
providing a salt solution to the salt solution feed chamber;
providing heat to the salt solution to maintain a temperature of at least 40° C.;
evacuating the purified water receiving chamber to a certain level vacuum;
providing cooling to the purified water to maintain a temperature below the feed;
optionally, applying pressure to the salt solution;
transporting water vapor through the membrane at a flux of 100 LMH or more; and
maintaining the vacuum by cooling of the purified water to at least 10° C. below the salt solution in the feed chamber.

13. The method according to claim 12, wherein the salt solution is sea water.

14. The method according to claim 12, wherein the salt solution is a fruit juice.

15. The method according to claim 12, wherein supporting the membrane comprises attaching the membrane to a carbon fiber plate or a rigid material.

16. The method according to claim 12, wherein the membrane comprises at least one nanoporous UHMWPE film.

17. The method according to claim 16, wherein at least one of the at least one nanoporous UHMWPE film is a hydrophilic polymer coated nanoporous UHMWPE film or a hydrophilic polymer laminated nanoporous UHMWPE film.

18. The method according to claim 12, wherein the membrane comprises four of the nanoporous UHMWPE films whereby the purified water with resistivity of no less than 10 MΩ·cm.

19. The method according to claim 4, wherein the nanoporous UHMWPE film is a hydrophilic polymer coated nanoporous UHMWPE film or a hydrophilic polymer laminated nanoporous UHMWPE film, whereby latent heat of vaporization is reduced by 1.5%.

* * * * *